Dec. 11, 1951     J. L. SAUNDERSON ET AL     2,577,814
PHOTOELECTRIC INSTRUMENT FOR DIRECT SPECTROCHEMICAL
ANALYSIS BY THE INTERNAL STANDARD METHOD
Filed Feb. 27, 1946     5 Sheets-Sheet 1

INVENTORS.
Jason L. Saunderson
BY Victor J. Caldecourt
Eugene W. Peterson

Griswold & Burdick
ATTORNEYS

INVENTORS.
Jason L. Saunderson
BY Victor J. Caldecourt
Eugene W. Peterson

Griswold & Burdick
ATTORNEYS

INVENTORS.
Jason L. Saunderson
BY Victor J. Caldecourt
Eugene W. Peterson

Griswold & Burdick
ATTORNEYS

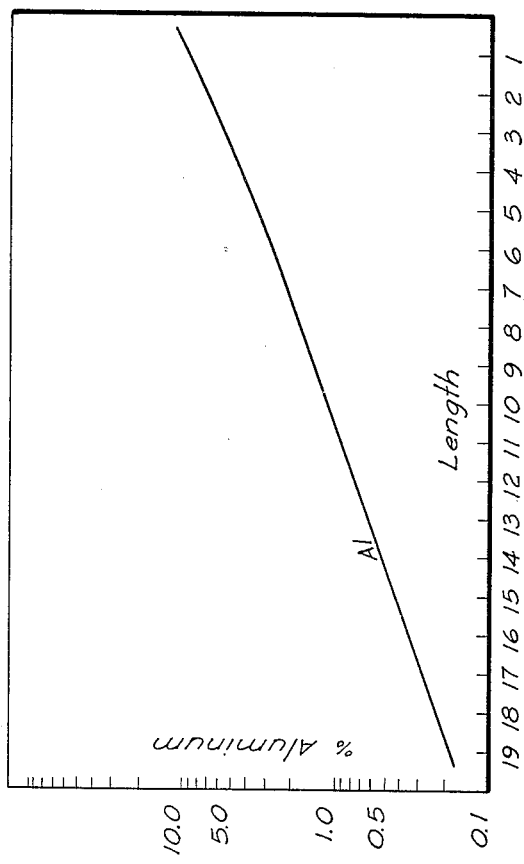
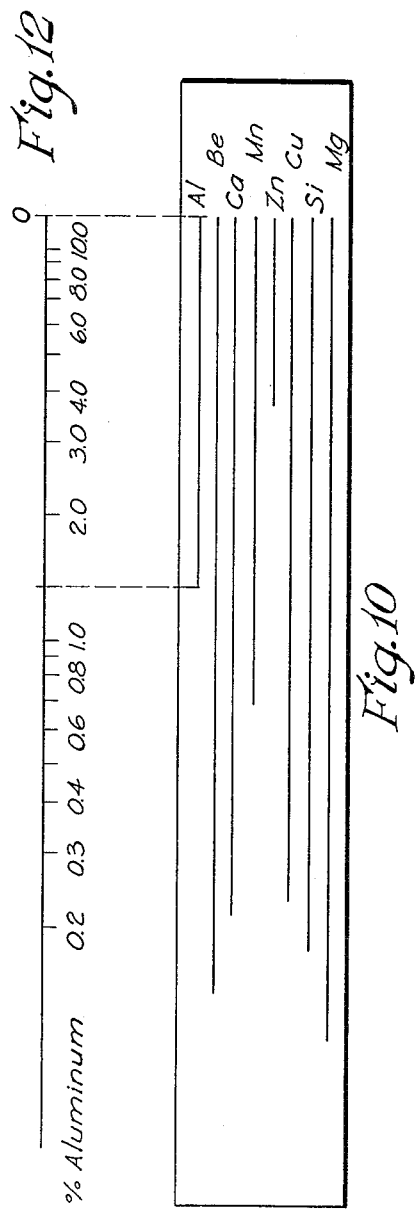
Fig.10
Fig.11
Fig.12
INVENTORS.
Jason L. Saunderson
Victor J. Caldecourt
Eugene W. Peterson
BY
Griswold & Burdick
ATTORNEYS Patented Dec. 11, 1951

2,577,814

UNITED STATES PATENT OFFICE 2,577,814

PHOTOELECTRIC INSTRUMENT FOR DIRECT SPECTROCHEMICAL ANALYSIS BY THE INTERNAL STANDARD METHOD

Jason L. Saunderson, Victor J. Caldecourt, and Eugene W. Peterson, Midland, Mich., assignors to The Dow Chemical Company, a corporation of Delaware Application February 27, 1946, Serial No. 650,676

9 Claims. (Cl. 346—33)

This invention relates to a direct-reading or photoelectric spectrometer for use in spectrochemical analysis. It concerns improvements both in the optical system and in the electrical measuring circuits of such an instrument.

Quantitative spectrochemical analysis by the internal standard method, an exceedingly valuable tool for the metallurgical industries, has heretofore been carried out almost entirely by photographic means, such as those described, for example, in U. S. Patents 1,979,964 and 2,043,053. This method, while of broad usefulness, is, for routine process control, disadvantageous in that a considerable period of time, at least several minutes and often much longer, elapses between the exposure of the photographic plate and its development and interpretation.

It has been appreciated that a considerably greater rapidity of analysis might be realized if the spectral lines to be compared, instead of being recorded photographically, were focused on separate photocells, the relative outputs of which could then be measured electrically. (See, for instance, the review in J. Opt. Soc. Amer. 34, 751 (1944).) However, the photoelectric spectrometers which have been proposed leave much to be desired in the way of simplicity of operation, as well as in matters of inherent accuracy and of stability in the presence of vibration and ordinary environmental changes.

It is therefore an object of the invention to provide an improved direct-reading spectrometer which may be made fully automatic and which is usually capable of giving complete analyses for as many elements as desired in a period of less than one minute. Another object is to provide an instrument of this character which may be operated continuously over long periods by non-technical personnel and yet exhibit an inherent accuracy equal to or exceeding that obtained with the spectrograph. A further object is to provide a spectrometer in which the relative accuracy of analysis for any given element is essentially constant over wide ranges of concentration of that element.

Another object of the invention is to provide an instrument embodying improved electrical means for integrating and comparing the relative outputs of two or more photocells when each is exposed to light of continuously varying intensity. Additional objects are to provide optical means for compensating for background radiation which may be received by a photocell together with a desired spectral line and electrical means for balancing out the dark current of the cell. A further object is to provide an improved circuit for determining the electric charge imposed by a photocell on a condenser, such circuit including a highly stable direct-current electron-tube amplifier.

Still other objects and advantages of the invention will be apparent from the description to follow, which is made with reference to the accompanying drawings, in which Fig. 1 is a simplified diagram illustrating the inter-relation of the essential elements of the apparatus;

Fig. 10 is a typical length of recorder tape, showing the record of a single analysis of a magnesium-base alloy;

Fig. 11 is a calibration curve for analysis of the element aluminum; and

Fig. 12 is a projected scale based on the curve of Fig. 11 and used in interpreting the record of Fig. 10.

PRINCIPLE

Figure 1:
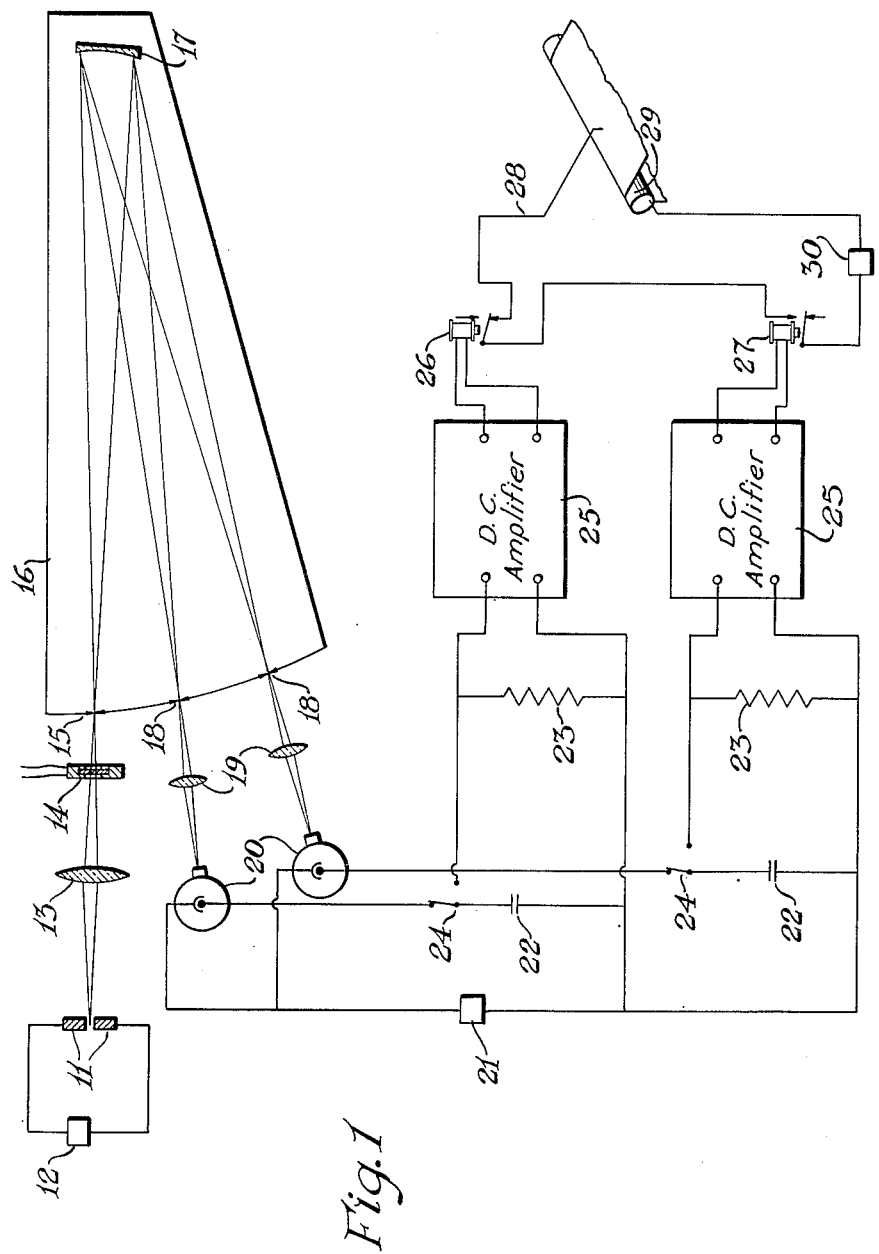

In the apparatus of the invention, light produced by sparking electrodes of the sample to be analyzed is resolved by a spectrometer which focuses characteristic spectral lines of the reference and unknown elements on sensitive photocells, causing the flow of minute photocurrents. The varying intensities of the lines during the sparking period are integrated by storing the correspondingly varying photocurrents in condensers. After the sparking period, these stored charges are compared by allowing the condensers to discharge through similar resistances and measuring the difference in the times required for such discharges to take place. Electron-tube amplifiers follow the course of the condenser discharges and actuate relays which operate a recorder, the indications of which can be calibrated directly in terms of the analysis of the sample being sparked.

SIMPLIFIED DIAGRAM

The essential elements of the new apparatus may be explained with reference to the simplified diagram of Fig. 1.

The material to be analyzed is formed into electrodes 11 which are caused to spark by connecting them across a high voltage source 12. Light from this spark is focused by a lens 13 through an electrically-opened normally-closed master shutter 14 onto the entrance slit 15 of a spectrometer 16. The entering light falls on a concave grating 17, which forms images of the slit along the Rowland circle, the positions of these spectral lines being dependent on the wavelengths present in the light. Exit slits 18 are located along the circle in positions to allow passage of selected lines corresponding to the internal reference element and the element being analyzed for in the electrodes 11. These selected lines are focused by lenses 19 on the sensitive elements of electron multiplier photocells 20, the operating potentials of which are supplied by a high voltage source 21.

During sparking of the electrodes, the spectral line falling on each photocell 20 causes a corresponding flow of current, which is stored in a condenser 22 connected in the circuit through a two-way switch 24. Later, the relative magnitudes of the charges thus accumulated are measured by connecting each condenser across its individual discharging resistor 23 by throwing the two-way switches 24. When these switches are thrown, the falling potentials of the condensers are followed by electron-tube direct-current amplifiers 25 in the output circuits of which are voltage-responsive relays 26 and 27 with their output terminals in series. The relay 26 in the circuit corresponding to the spectral line of the unknown element is of the normally-closed type, while the relay 27 in the circuit of the reference element is normally open. Whenever operation of the amplifiers holds the contacts of both relays closed at the same time, the pen circuit 28 of a moving-tape recorder 29 is energized by a source 30, causing a mark to appear on the tape.

In practice, it is necessary to choose the reference spectral line, or to design the circuits, so that during sparking the reference condenser reaches a higher potential than the other condensers. The relays and amplifiers are adjusted so that the relays are actuated whenever the potentials across the condensers exceed a predetermined low value, conveniently about 1.0 volt.

In making an analysis, the switches 24 are set to connect the photocells to their condensers, and the sample to be analyzed is sparked. The resulting spectral lines falling on the photocells 20 cause photocurrents which charge the condensers 22 at rates proportional to the intensities of the incident lines. After the sparking period, the switches 24 are thrown simultaneously, whereupon the condensers 22 begin to discharge through their resistors 23. As soon as the switches close, the amplifiers 25 detect condenser voltages well over the predetermined low value, and actuate both relays 26 and 27, leaving the recorder circuit still open. As discharge of the condensers continues, the falling potential in the condenser corresponding to the unknown element reaches the predetermined low value first, whereupon the relay 26 is de-actuated and closes. Current at once flows in the recorder circuit 28, making a visual record on the moving tape. When, after an interval of time, the falling potential across the reference condenser also reaches the predetermined value, the relay 27 is de-actuated, and the recorder circuit is again broken. As a result of this sequence, the length of the mark on the moving recorder tape is a direct indication of the difference in times of discharge of the reference and the unknown condensers. This difference is a function of the concentration of the unknown element in the sample, as will be evident from the following considerations.

GENERAL CONSIDERATIONS

Theory

Assuming that the photocells of Fig. 1 are operating linearly, their current outputs at any instant are proportional to the intensities of the incident spectral lines. The total charges of the condensers after the sparking period, then, are proportional to the integrated intensities $I_u$ and $I_r$ of the unknown and the reference lines. These charges, and hence these intensities, can be determined by measuring the times required for the condensers to discharge through known resistances.

Thus, the discharge of a condenser of capacity C through a resistance R follows the equation:

(1) $$E = E_0 e^{-t/RC}$$

where $E_0$ is the initial voltage, $E$ is the voltage after time $t$, and $e$ is the base of natural logarithms. Considering two condensers of capacities $C_u$ and $C_r$, having initial voltages $E_u$ and $E_r$ and discharging through resistances $R_u$ and $R_r$, the times $t_u$ and $t_r$ required for the condensers to reach a predetermined low voltage $E_s$ are, from equation 1:

(2) $$t_u = R_u C_u \ln E_u / E_s$$
(3) $$t_r = R_r C_r \ln E_r / E_s$$

If the resistances and capacitances are chosen so that their products are equal to some selected value RC, that is, if (4) $$R_u C_u = R_r C_r = RC$$

then, by combining Equations 2, 3, and 4, and taking $t_r - t_u = \Delta t$, it follows that (5) $$\Delta t = RC \ln E_r / E_u$$

But the initial voltages $E_r$ and $E_u$ on the condensers are proportional to the total charges, and hence also proportional to the integrated intensities $I_r$ and $I_u$ of the spectral lines. Whence, substituting in Equation 5, there appears:

(6) $$\Delta t = RC \ln I_r / I_u + \text{constant}$$

From spectrochemical theory, it is known that the ratio of the intensities of the spectral lines of the reference and unknown elements is approximately proportional to the ratio of the concentrations $X_r$ and $X_u$ of these elements. Since the reference element is essentially of constant concentration, it follows from Equation 6 that (7) $$\Delta t \cong -RC \ln X_u + \text{constant}$$

From these considerations, then, it is seen that a plot of $\Delta t$, the difference in times of discharge of the reference and unknown condensers, against the logarithm of $X_u$, the concentration of the unknown element, is essentially linear.

In the apparatus of Fig. 1, this time difference, Δt, is, as explained, read directly from the length of the mark on the recorder tape. In making analyses, then, the apparatus is first calibrated by determining the length of the recorder mark for several samples in which the element being analyzed for is of known concentration. Then a line drawn through a plot of these lengths against the logarithms of the concentrations of the element gives the desired calibration chart. From this, analyses of unknown samples can be run by simply sparking the sample according to the procedure described, determining the length of the resulting recorder mark, and reading the concentration from the calibration line.

For analytical work of extreme accuracy, where minor departures of the calibration curve from linearity may be of consequence, the entire range of concentrations to be determined analytically can be explored with samples of known concentration, and a wholly empirical calibration curve developed.

Advantages

Several important advantages arise from the fact that, in the apparatus of the invention, the quantity actually measured, viz. the difference in discharge times of two condensers, varies logarithmically with the concentrations to be determined. In the first place, the spectrochemical method in general tends to have an essentially constant relative accuracy for the quantitative determination of an element over wide ranges of concentration. For instance, the absolute error in determining an element at 10 per cent concentration is roughly about ten times as great as the absolute error at 1.0 per cent concentration. The logarithmic calibration curves of the present apparatus are similar in this respect, in that they may be read with constant relative accuracy over the whole scale. A second advantage, apparent from Equation 7 above, is that the slope of the logarithmic calibration curve is independent of changes in apparatus conditions, since all proportionality factors fall into the constant in the equation. Thus, a change in the sensitivity of a photocell circuit, or dirt in the optical path, will only shift the calibration curve parallel to itself without altering its slope. In consequence, if a change in the apparatus occurs, it is necessary, in order to recalibrate, to run only a single standard sample, to give a Δt value which, with the constant known slope, will give the complete new calibration curve.

An additional advantage of the apparatus of the invention is that, although the instantaneous intensities of the spectral lines, and hence also the instantaneous photocurrents, may vary considerably due to flickering of the spark, the condensers, in storing these currents, effect a complete integration over the time of sparking. As a result, when the charges on the condensers are measured, there is obtained an integrated relative intensity value for the two spectral lines which is practically independent of variations in both the total intensity of the spark and the time of sparking. Since this integration is quite similar to that effected by the photographic plate of a spectrograph, the method of the invention permits use of virtually all the established techniques of the internal standard method so well known in spectrographic analysis.

Background compensation

In the invention, the principle of integrating spectral line intensities by charging condensers from photocells focused on the lines permits a novel method of compensating for the background radiation accompanying the spectral lines.

As is known, in a spark spectrum, in addition to the lines of the elements being analyzed for, there is, at every wavelength, a certain amount of background radiation. In the apparatus of the invention, some part of this background enters the photocell together with the line on which it is focused. As long as the intensity of the line is high relative to that of the background, the latter is of little consequence. However, when the cell is focused on a line of weak intensity, as, for instance, when analyzing for an element present in low concentration, the background may be a substantial part of the total light incident on the cell. While this circumstance does not render analysis impossible, since the apparatus is calibrated empirically, the relative accuracy of analysis will be reduced, largely because the intensity of the background tends to vary somewhat from sample to sample.

In the invention, this effect of background radiation may be largely or wholly overcome by an optical system including a shutter which permits repeatedly exposing the photocell first to the desired line together with its background and then to a selected portion of the background alone. At the same time, operation of the electrical circuits is synchronized with the shutter so that the condenser associated with a photocell, while being charged by the cell each time the latter is exposed to the line and background, is also allowed to discharge through the cell each time the latter is exposed to the background only. By making the times of charging and discharging equal, the additive effect of the photocurrent due to the background during charging is nullified by its subtractive effect during discharging. At the end of the sparking period, then, the condenser charge contains little or no component attributable to the background, and is a funtcion only of the intensity of the desired line.

Dark current compensation

The method of background compensation just discussed has the further effect of also compensating for the dark current of the photocells, thereby rendering frequent adjustment of the cell circuits unnecessary. However, an alternative method of dark current compensation may also be desirable, especially for use in those instances where background compensation is not required. Such dark current compensation may be accomplished by connecting a high resistance across the photocell at the time it is charging its condenser, and arranging this circuit so that the current flowing through the resistance exactly equals the dark current. Balancing means for making this adjustment are provided and will be described later.

Direct current amplifier

In the present spectrometer, the direct-current amplifiers which follow the discharge of the photocell condensers must have a high gain in order properly to actuate the relays in their output circuits. On the other hand, they must also be accurate and stable, preferably with so little drift that they require adjustment only once or twice a day. This is achieved, according to the invention, by means of two-stage direct-current amplifiers which are provided with feed-back networks to render them highly degenerative and hence stable. The amplifiers are normally maintained in the degenerative state. However, at the moment of discharging the photocell condensers, the feed-back networks are temporarily broken, converting the amplifiers to a sensitive or high gain condition. After the discharge, the feedback circuits are again closed, returning the amplifier to a stable state in which any tendency toward drift is compensated.

DESCRIPTION OF APPARATUS

With the foregoing general principles in mind, the detailed construction of a preferred embodiment of the invention may be explained with reference to Figs. 2 to 9. The particular apparatus illustrated is designed for the repetitive determination of minor constituents in metals, e. g. the routine control analysis of magnesium-base alloys.

In the apparatus, the mountings for the electrodes being analyzed and the source of energy for sparking them are of known construction and are not shown. Adequate descriptions of these elements, as well as methods of preparing the electrodes, are given in J. Opt. Soc. Amer. 34, 104–5 and 116–9 (1944).

Optical details

The spectrometer housing 16 and the grating 17 (Fig. 1) are of known type. It is important that the spectrometer be rigid and solidly mounted, and desirable that the housing be maintained at a constant internal temperature, conveniently 90° F., as by a thermostated circulating air heater.

Figure 2:
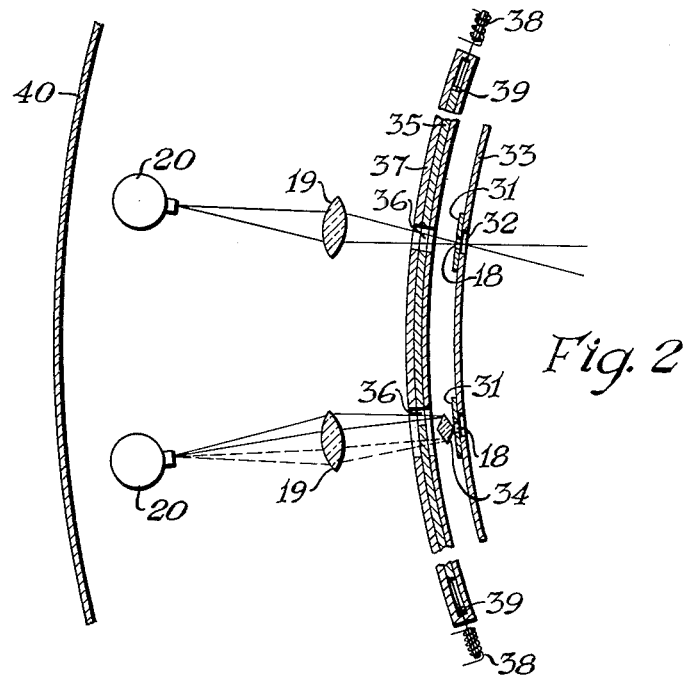
Fig. 2 is a horizontal section through the photocell compartment of the spectrometer, showing the arrangement of the optical elements.

As shown particularly in Fig. 2, the spectrometer exit slits 18 are formed in thin metal plates 31 which are adjustably mounted over slots 32 in the spectrometer housing 16 along its focal curve 33 in positions to pass the desired spectral lines. In general, the width of an exit slit should be about two times that of the entrance slit for those lines, such as the reference line, on which no background correction is necessary, and about four times for lines on which a correction is to be made.

Figure 3:
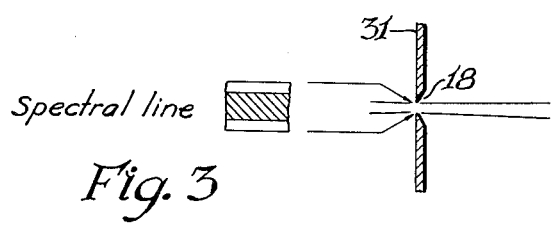
Fig. 3 is a sketch illustrating the centering of a spectral line in an exit slit of the spectrometer, the line being shown enlarged with respect to the width of the slit.
Figure 4:
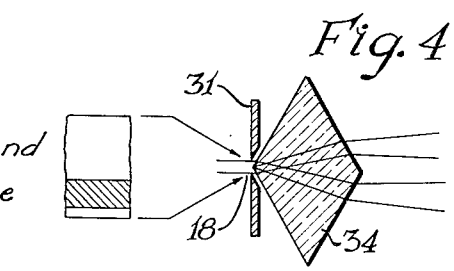
Fig. 4 is a similar sketch illustrating the positioning of a spectral line in an exit slit when a background compensating prism is used.

If no background correction is needed, as in the case of the line of the reference element, the line is approximately centered in the exit slit 18 (Fig. 3). However, when a background correction is made, as in the case of the line of an unknown element, the line is directed through one side of the slit, allowing the background radiation to pass through the other side (Fig. 4). In this case, a small prism 34 is centered just behind the slit so as to split the light into two beams, one of which includes the desired line, and the other contains only the background. Each of these beams enters the lens 19 and is focused on the photocell 20 (Fig. 2). The purpose of the prism is to separate the two beams sufficiently to allow satisfactory operation of the background compensation mechanism.

This compensation is effected by means of a shutter interposed between the exit slits and the lenses and consisting of a curved metal strip 35 having slits 36 cut in it in positions corresponding to the exit slits and being somewhat wider than the latter. This shutter is mounted to reciprocate in a fixed guide 37, and is moved back and forth by opposed solenoids 38 which are attached to the ends. Movement of the shutter is limited by stops 39 one of which is adjusted so that at the limit of shutter travel in one direction the shutter is in a position to allow free passage of the spectral lines from the exit slits to the lenses and to block the background beam (as shown in Fig. 2). The other limit of travel is such that the shutter is in a position in which, in the case of lines requiring no background compensation, it cuts off all light to the photocell, and in the case of lines requiring correction, it cuts off the spectral line but allows free passage of the background beam. The shutter is reciprocated by alternately activating the solenoids in synchronism with the photocell condenser reversing circuits, as will be later described.

The exit slits, prisms, shutter mechanism, lenses, and photocells are all mounted rigidly on the frame of the spectrometer by means not shown, and are enclosed in a light-tight case 40. The lenses and prisms are of quartz or other material transparent to ultraviolet light.

Figure 5:
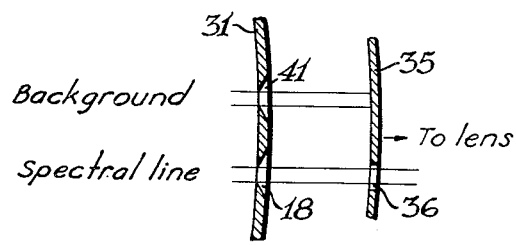
Fig. 5 is a sketch showing the details of another slit arrangement for compensating for background spectral radiation.

An alternative method of background correction, useful when the immediate background of a selected line contains interfering lines, is shown in Fig. 5. In this case, a second exit slit 41 is located near the slit 18 for the desired line, but in a non-interfering spectral region, and the shutter 35 is adjusted to cut off beams from the two slits alternately. Both beams are, of course, focused on the same photocell.

While Figs. 1 and 2 illustrate a spectrometer with only two exit slits and photocells, one for the reference element and one for the unknown, it will be appreciated that any desired number of exit slits and photocells may be arranged along the focal curve at positions corresponding to various spectral lines to permit determination of several unknown elements at once, using the same, or more than one, reference spectral line. In such cases, certain of the beams passing through closely adjacent slits may, if desired, be deflected by mirrors before entering their corresponding lenses and photocells, thus avoiding crowding together photocells directly behind the focal curve.

The considerations involved in selecting appropriate spectral lines for any given analysis are similar to those in spectrographic work, except that greater latitude in choosing lines is possible. (See discussion by Saunderson et al. in J. Opt. Soc. Amer. 35, 681 (1945), a paper which also describes the present invention.)

Photocells

While any of a number of types of photocells may be employed in the apparatus, optimum results are obtained with photo-emissive tubes, particularly electron multiplier phototubes, such as the 931A, which combine extreme sensitivity with high amplification. These latter phototubes, however, present a special problem because of the great variation in output occasioned by slight changes in the position of incidence of the spectral line.

Figure 6:
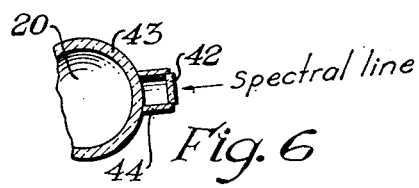
Fig. 6 is a horizontal section through a photocell and its diffuser.

Thus, as will be appreciated, from Fig. 1, while the positions of the spectral lines of the elements are fixed, the light beams, after passing the exit slits, move with every motion or flicker of the spark between the electrodes 11. The lenses 19, in focusing the beams on the photocells 20, eliminate the effects of motion in the light source except for aberrations resulting from using different portions of the lens. However, even these slight residual motions are of importance with a receiver as sensitive as the electron multiplier photocell. To offset this latter effect, it is very desirable to interpose some form of diffuser between the lens and the photocell. A convenient diffuser, as shown in Fig. 6, consists of a ground quartz plate 42 mounted a short distance in front of the envelope 43 of the photocell, the space between the plate and the envelope being surrounded by a light shield 44. With this construction, critical positioning of the phototubes is not required.

Measuring circuit

Figure 7:
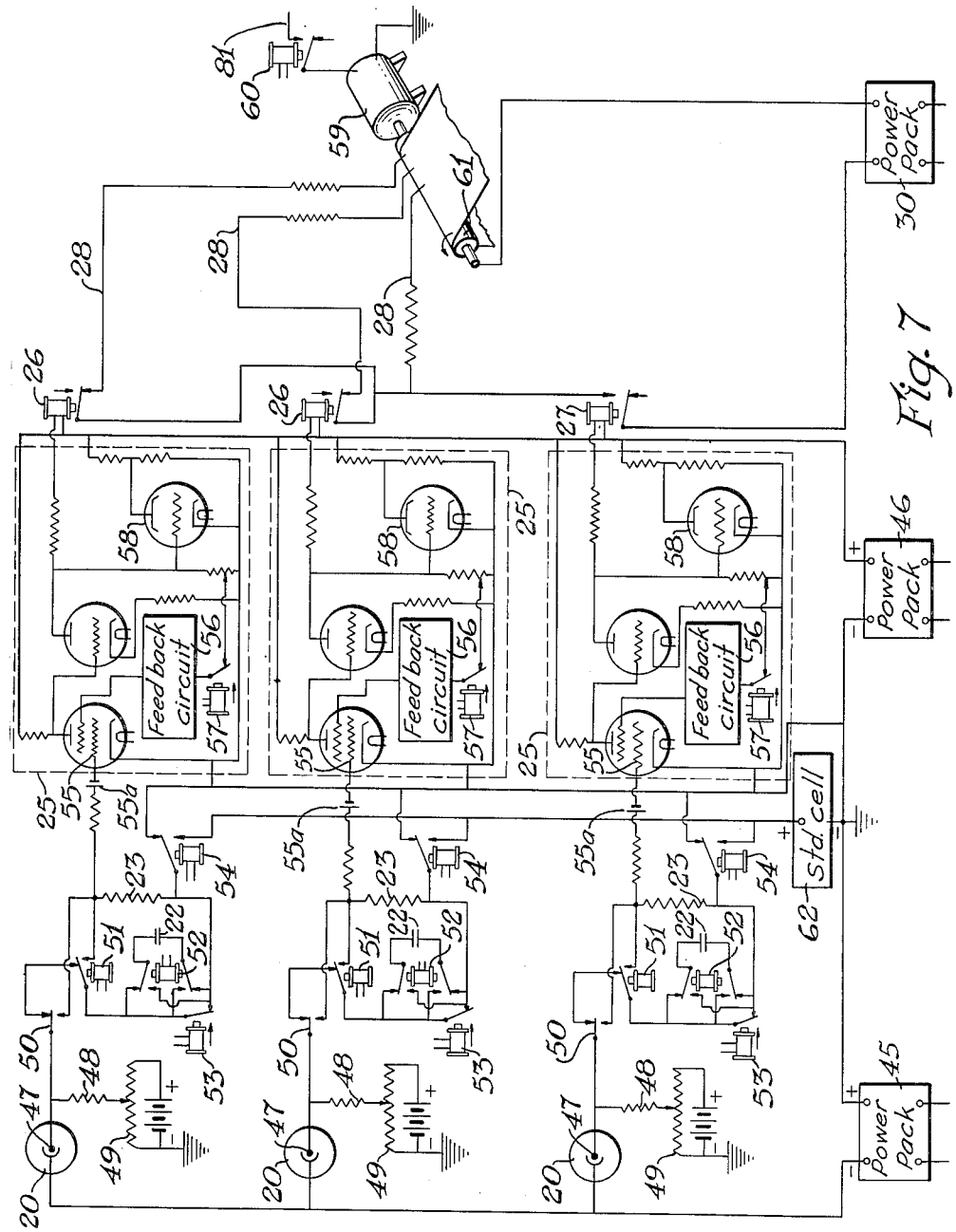
Fig. 7 is a diagram of the electrical measuring and recording circuits of the apparatus.

The basic electrical measuring circuits of the apparatus may be explained with reference to Fig. 7. For simplicity, the diagram shows only three multiplier phototubes and measuring circuits, for determining the relative intensities of two unknown spectral lines relative to the same internal standard line. In Fig. 7, the timing circuits for actuating the various relays are not shown, and the electron-tube amplifiers are indicated in simplified form. The circuit is shown in its normal position before an analysis is run.

The operating potential for all the electron-multiplier tubes is supplied by a 1000-volt regulated power supply 45 constructed essentially according to the Miller design (Electronics, November 1941, p. 29). The 250-volt amplifier power pack 46 is of a similar type.

The dark-current of each phototube 20 is compensated by a leak circuit in which the photocell anode 47 is connected through a high resistance 48 (1000 megohms) to a potentiometer 49 (100 volts), one terminal of which is grounded.

During the sample sparking period, the output of each photocell, except for the small dark-current compensation, passes in series through a manual test switch 50 and the normally-closed contacts of a relay 51 to its storage condenser 22, the return circuit being through the normally closed contact of a relay 54. Actuation of the relay 54 interposes a standard cell 62 in the return circuit. The polarity of the condenser may be changed by a reversing relay 52, and the condenser is shorted, except during measurements, by another relay 53.

At the end of the sparking period, each condenser may be isolated from its photocell and connected directly across its discharging resistor 23 by operation of the relay 51. As this operates, each condenser is connected through a bias cell 55a to the input grid 55 of the corresponding amplifier 25, which in turn actuates a corresponding recorder relay 26 or 27.

Each amplifier 25, which will be more fully described later, comprises two stages and is stabilized by a feedback circuit 56 which may be broken by a relay 57. The magnitude of the amplifier output is indicated visually by an electron-ray tube 58, the ray-control grid of which is connected in the plate circuit of the second amplifier stage.

The recorder relays 26 and 27 in the amplifier outputs control the recorder pen circuits 28, as already explained with reference to Fig. 1. The recorder, which is conveniently of the moving-tape type described in Patent 2,251,742, is driven by a self-starting synchronous motor 59, the power supply of which flows through a relay 60.

In the circuit illustrated, the storage condensers 22 should preferably be of such construction as to retain little residual charge after they have been discharged rapidly, condensers using polystyrene as the dielectric being especially suitable (J. Opt. Soc. Amer. 35, 690 (1945)). The electrical magnitudes of the capacitance of each condenser (0.1 to 1.0 microfarad) and of the resistance of each discharging resistor (5 to 50 megohms) are chosen so that their mathematical product is of the order of several seconds and is substantially equal for all condenser-resistor pairs in the apparatus, in order to satisfy the mathematical requirements of the system, as in Equations 4 and 5 above.

Operation of circuit

As long as the relays are in the positions shown in Fig. 7, the input grids 55 of the amplifiers 25 are all maintained at a fixed potential below ground potential determined by the bias cells 55a. With this condition obtaining, the operator first adjusts each amplifier-relay circuit so that each indicator tube 58 or "magic eye" is just "closed," and so that each recorder relay 26 or 27, though still in the normal position, will be activated whenever the corresponding amplifier input-grid potential is depressed below the aforesaid bias potential.

With the amplifiers thus normalized, and with the photocells 20 receiving no light, dark current compensation is made. Each test switch 50 is thrown, connecting each photocell directly to its amplifier input grid. At the same time, the feedback relay switches 57 are opened to place the amplifiers in the high-gain state. Each voltage-divider 49 is then adjusted until the corresponding indicator tube 58 is again "closed." The entire dark current of each photocell is thus balanced out, and flows through its leak resistance 48. The switches 50 and 57 are returned to normal positions, and the measuring circuits are ready for use.

In making an analysis with the spectrometer utilizing the measuring circuit of Fig. 7, the sample to be analyzed is first sparked for a few seconds, after which the exposure period is initiated by a timing system later to be described which actuates the master shutter 14 (Fig. 1) and the condenser shorting relays 53 (Fig. 7) at the same instant. The light of the spark then enters the spectrometer and the resulting spectral lines fall on the photocells 20, causing photocurrents to flow; the condensers 22, simultaneously unshorted, store these photocurrents throughout the sparking period. As sparking proceeds, the solenoids 38 for reciprocating the background compensation shutter (Fig. 2) and the condenser reversing relays 52 (Fig. 7) are operated in synchronism. Thus, each condenser is alternately charged with photocurrent corresponding to the intensity of the spectral line plus background and discharged for an equal period with photocurrent corresponding to the intensity of the background alone.

When the exposure period has ended, the timing system closes the master shutter 14, cutting off all light to the photocells. It simultaneously places the background shutter solenoids 38 and the condenser reversing relays 52 in normal positions, and closes the recorder motor relay 60, setting the recorder roll 61 in motion. The condenser measuring relays 51 and 54 and the feedback circuit relays 57 are then actuated simultaneously, connecting the condensers 22 across their discharging resistors 23, isolating the amplifier input grids 55 from ground, connecting the standard cell 62 in circuit, and converting the amplifiers to a high-gain condition. Assuming that the potentials on the charged condensers all exceed in magnitude that of the standard cell, the amplifier input grids 55 instantly detect potentials below the bias potential, and the amplifiers actuate the recorder relays 26 and 27. The recorder pen circuits 28 for the unknown elements remain open, but the circuit for the reference element, involving the relay 27, is at once closed, so that recording begins on this one pen. Then, when the decreasing potentials on the condensers of the unknown elements reach voltages equal in magnitude to that of the standard cell, i. e. when the grids 55 reach bias potential, the relays 26 are released, and the remaining recorder pen circuits close and cause marking of the recorder tape. As soon as the decreasing potential on the reference element condenser also equals that of the standard cell, its amplifier deactuates the relay 27, and the pen circuits are again broken, so that all recording stops. The condenser discharge relays 51 and 54, the condenser shorting relays 53, the amplifier feedback relays 57, and the motor relays 60 are then all released, placing the circuits in the normal or inactive condition, as in Fig. 7, and returning the amplifiers to the degenerative or self-stabilizing state. The entire apparatus is then ready for another analysis.

*Timing system*

Figure 8:
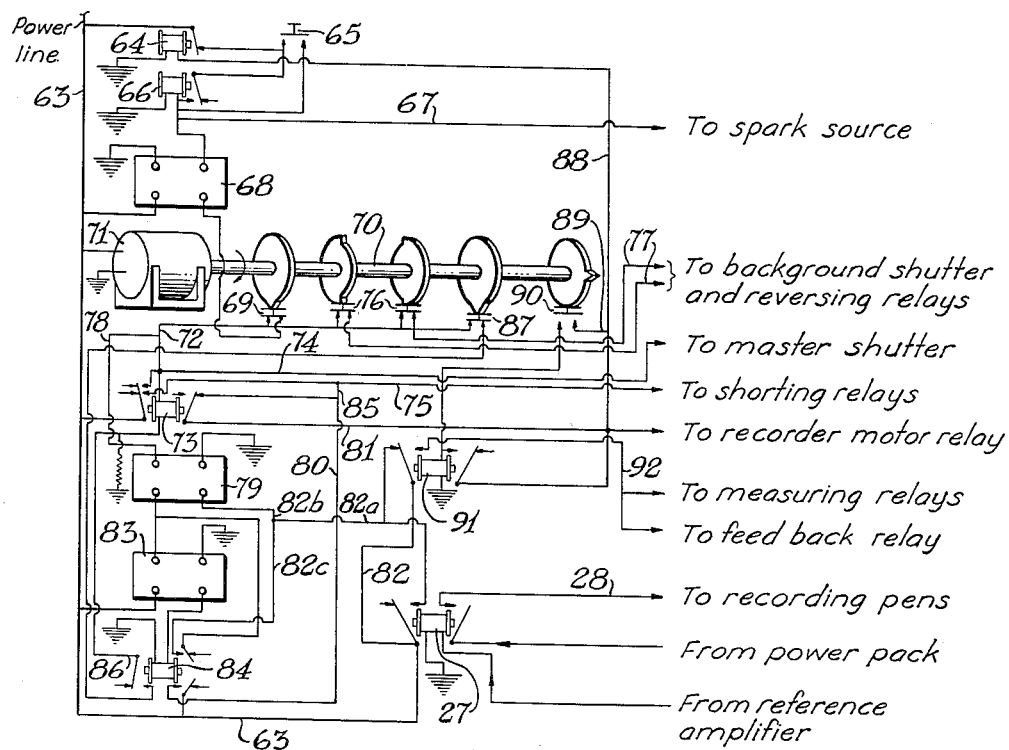
Fig. 8 is a circuit diagram of the automatic timing system of the spectrometer.

The details of the timing mechanism for initiating the operating impulses for the various relays in the measuring and spark circuits of the direct-reading spectrometer are shown in Fig. 8. The controlling elements of the mechanism are two timers and a series of cam-operated switches, together with several relays. The cams rotate continuously when the spectrometer is in use, while the other elements function only in a predetermined sequence each time the "start" switch is operated to make an analysis.

In the circuit of Fig. 8, which is shown in its normal or inactive condition, the current is drawn from a line source 63, the return circuit being in all cases through ground. The current first flows through a normally closed cut-out relay 64 to the "start" switch 65, and from there to the coil of a self-locking normally-open starting relay 66. This starting relay, when closed, supplies current through a line 67 to operate the spectrometer spark source 12, and also to actuate a first timer switch 68. This latter is set to allow the elapse of several seconds for the electrode spark to stabilize itself before starting the condenser charging cycle.

When the timer switch 68 closes to start the spark exposure period, potential is supplied from the line 63 to the start cam switch 69, the cam of which is mounted on a shaft 70 turned continuously by a geared synchronous motor 71 at a slow rate, conveniently once every two seconds. As soon as this cam switch 69 closes, the control impulse flows through a lead 72 to the coil of a multi-contact self-locking starting relay 73. When this starting relay is actuated, power flows from the source 63 through a lead 74 to the master shutter 14 on the spectrometer inlet (Fig. 1), through a lead 75 to open the shorting relays 53 on the photocell measuring condensers (Fig. 7), through the lead 72 to reversing cam switches 76 and thence through leads 77 to the solenoids 38 operating the background compensating shutter 35 and also to the condenser reversing relays 52, and through a control lead 78 to a second timer switch 79. This actuation of the starting relay 73 also breaks the connection between a power-supply circuit 80 and the lead 81 to the relay 60 operating the spectrometer recorder motor 59 (Fig. 7). The entire system of Fig. 8 then remains in this condition until the exposure period is ended by operation of the second timer 79.

As soon as this second timer switch 79 closes, current flows from a power supply lead 82—82a—82b to energize a quick-closing delayed-release control relay 83, which in turn actuates the coil of a multi-contact stopping relay 84. When this latter relay 84 is energized, it connects the power supply lead 82—82a—82c to the coil of the control relay 83, thus locking both the control and the stopping relays in the actuated position. This same actuation of the stopping relay 84 also connects the power line 63 to the power supply circuit 80 for the recorder motor, which circuit is connected by a jumper 85 to the lead 75 for the condenser shorting relays, thus preventing the latter from being deactuated. Likewise, actuation of the stopping relay 84 closes a circuit 86 connecting the stop cam switch 87 with the ground side of the coil of the starter relay 73. Thus, as soon as the stop cam rotates to close the switch 87, the latter shorts out the coil of the starter relay 73, deactuating the latter. The starter relay 73 at once drops out, breaking the power supply lead 74 to the master shutter 14, thus terminating the exposure period, and also allowing the timer 79 to reset. This dropping out also connects the power supply circuit 80 to the lead 81 to the recorder motor relay 60 (Fig. 7), starting the motor 59.

This same current supplied to the recorder lead 81 also flows through a lead 88 to the coil of the cut-out relay 64, actuating it and breaking the power supply to the locked starting relay 66. This latter then opens, shutting off the power supply to the spark source 12 and the first timer switch 68, allowing the latter to reset.

The current in the recorder motor lead 81 is also transferred by the lead 88 and a second lead 89 to the measuring cam switch 90, which, when it rotates into closed position, energizes the coil of a multi-contact self-locking measuring relay 91. This latter, on closing, connects power from the source lead 82 to leads 92 for the condenser measuring relays 51 and 54, and the amplifier feedback relays 57 (Fig. 7), thus starting the measuring cycle of the instrument. This closing of the measuring relay 91 also breaks the connection between the power lead 82 and the lead 82a, but it is simultaneously re-established by the closing of auxiliary contacts on the reference amplifier recording relay 27, which is actuated by its amplifier at the same instant that the measuring cycle begins, as already explained with reference to Fig. 7.

When the measuring cycle is completed, the reference amplifier releases its relay 27, thus breaking the power supply to the power lead 82a—82c and de-energizing the coil of the control relay 83. This delayed-release-relay is set to remain closed a few seconds to allow the recorder motor time to run out extra tape, after which the relay opens. When it opens, the stopping relay 84 is thus deactuated, and shuts off the power to the recorder motor leads 80 and 81, stopping the motor and de-energizing both the cut-off relay 64 and the measuring relay 91, returning all the circuits to the normal state ready for the next analysis.

As shown in Fig. 8, the cams of the starting switch 69 and the stopping switch 87 provide only momentary closing of their respective circuits, and are set so that they operate simultaneously. The reversing cam switches 76 close their circuits alternately, each circuit remaining closed for one half revolution of the camshaft. The particular reversing cam which holds the background shutter in position to transmit the spectral lines is timed to close simultaneously with the start and the stop cams. The cam of the measuring switch 90, which likewise closes its circuit only momentarily, is set to lag the stop cam by an appreciable interval, such as one-fourth of a revolution, to allow the recorder motor time to reach speed before the measuring cycle begins.

The circuits of Fig. 8 render operation of the spectrometer entirely automatic. Thus, the operator, after inserting the electrodes to be analyzed into their holders, merely pushes the "start" button 65. The spark across the electrodes is at once turned on. Then, after a warm-up interval determined by the timer 68, the master shutter on the spectrometer inlet and the condenser charging circuits operate as soon as the starting cam 69 permits. The background shutter remains in position to pass the spectral lines for a full second until moved by the reversing cam, after which the shutter reciprocates at one-second intervals. When the second timer 79 indicates that the condenser charging period should end, the stop cam 87 closes the master shutter and turns off the spark source, both at the end of the next "background" exposure of the shutter, this proper timing to insure an equal number of "line" and "background" exposures being maintained by the action of the stop cam 87, independent of the setting of the second timer. As soon as the charging period has ended, the recorder motor starts up. After a half-second interval fixed by the measuring cam 90, during which the motor reaches its speed, the measuring cycle is initiated, control of all circuits is transferred to the reference amplifier relay 27, and the making of a record on the recorder tape begins. When all condensers are discharged to the predetermind low potential, the recorder motor continues to run out tape for a brief interval set by the delayed-release relay 83, to give enough space to permit the tape to be torn off easily, after which all circuits return to their normal state ready for another analysis. The entire operation, which requires thirty to forty seconds to complete an analytical record ready to be interpreted, is thus fully automatic. Errors due to the human element are practically eliminated, and a permanent record, available for checking at any time, is made.

*Amplifier*

Figure 9:
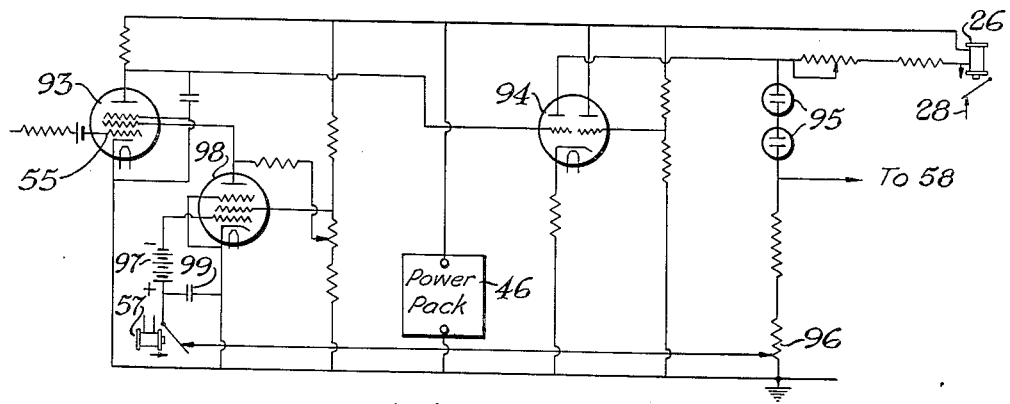
Fig. 9 is a detailed circuit diagram of one of the amplifiers in the circuit of Fig. 7.

A circuit diagram of the direct-current amplifier 25 used in following the falling potentials on the photocell condensers of the spectrometer is given in Fig. 9.

As shown, the first stage of the amplifier consists of a high gain pentode 93 with low screen and plate voltages, e. g. a 6J7 or 6C6, so that the input resistance will be high. This first stage is direct-coupled to the second stage 94, comprising two triodes in one envelope, e. g. a 6SN7, operated at conventional voltages and connected to stabilize the plate current. The output of this stage is supplied to the recording pen relay 26, as previously described. The amplifier is rendered highly stable by a feedback circuit comprising neon glow lamps 95, a voltage-divider 96, battery 97, and a third stage or pentode 98, e. g. a 6J7, the plate of which is coupled to the second grid of the first stage. The feedback circuit may be broken by the feedback relay switch 57. The terminal of the switch 57 connected through the battery 97 to the control grid of the third stage is also connected to a condenser 99, conveniently of about 1.0 microfarad capacity, the other side of the condenser being connected to the cathode of the third stage.

As long as the feedback circuit is closed, the amplifier is in a low gain, highly stable state and exhibits little drift. At the same time, the condenser 99 acquires a charge consistent with the balance in the system. Then, when the feedback circuit is opened by the relay 57 in response to the timing system of the spectrometer, the amplifier is converted to a high gain condition for the measuring period. However, during this period, the condenser 99 tends to retain its charge, preventing the third-stage grid potential from changing appreciably during the high-gain period. Thus, when the relay 57 is again closed at the end of the measuring period, the amplifier is returned to the original stable condition.

The amplifier of Fig. 9, by virtue of the action of the condenser 99 and the feedback circuit, remains balanced almost indefinitely, and requires adjustment of the voltage-divider 96 perhaps only once a week while in continuous use.

INTERPRETATION OF RESULTS

Fig. 10 illustrates a typical length of the recorder tape of the direct-reading spectrometer containing the record of a single analysis of a magnesium-base alloy. The particular record shown was obtained with a spectrometer utilizing eight photocells and gives the analysis of each of seven elements relative to magnesium as the internal reference standard.

In making the analysis, the recorder was set to move the tape at a convenient speed, in this case 1.0 inch per second, the duration of the measuring period being about 12 seconds. The recorded line of each element on the tape is made by the pen associated with the photocell, amplifier, and relay corresponding to that element, as already set forth in detail. When the spectrometer reaches its measuring cycle, the recorder first starts the tape moving (from right to left, Fig. 10). Then, as soon as discharge of all condensers begins, the line for magnesium, the reference element, starts to appear. When the potential of the discharging reference condenser reaches that of the standard cell, drawing of all lines ceases and the recorder then stops. The length of the magnesium recorded line thus is a measure of the integrated intensity of the magnesium reference spectral line. The lengths of the other recorder lines are measures of the intensities of the spectral lines of the unknown elements relative to magnesium, and hence measures of the concentrations of those elements, as explained previously.

Fig. 11 is a typical calibration curve for the unknown element aluminum. The curve was obtained empirically by determining the lengths of the recorder lines observed in sparking electrodes of several different magnesium alloys of known aluminum contents.

For convenience in reading the recorder lines, this calibration curve (Fig. 11) may be projected onto a straight scale (Fig. 12) which is marked off to correspond to the aluminum contents as given by the calibration curve. Then, to observe the percent aluminum, as shown by the recorder tape, it is necessary merely to place this projected calibration scale beside the aluminum recorded line, with the zero point of the scale opposite the end of the recorded line, and to read off the percent aluminum from the scale at a point opposite the other end of the recorder line. Similar calibration scales for the other elements shown on the recorder tape may be prepared in like manner, and are used in the same way.

In the event that the calibration curve of an element shifts parallel to itself, due to changes within the optical or electrical systems of the instrument, it is necessary merely to change the position of the zero point of the projected scale a compensating amount, the magnitude of which may be readily determined by "analyzing" a single sample of known analysis. In actual practice, a known sample is run every few hours, and the zero points on the calibration scales of all elements corrected accordingly. In general, the corrections thus observed remain exceedingly small, even over periods of many weeks.

It will be appreciated that the foregoing specification is descriptive, rather than strictly limitative, of the present invention, and that numerous variations of the detailed constructions shown are possible without departing from the spirit of the invention, as defined in the claims.

In this specification and claims, the term "unknown element" means an element the concentration of which is to be determined in the sample being analyzed and the term "reference element" means an element of known concentration in the sample which is being used as an internal standard for the analysis.

Attention is directed to our divisional applications Serial No. 28,138 filed May 20, 1948, and Serial No. 133,181 filed December 15, 1949.

See also divisional application Serial No. 213,406, filed March 1, 1951.

What is claimed is:

1. In a direct-reading spectrometer, in combination with means for focusing characteristic spectral lines of an unknown and a reference element on separate photocells during an exposure period: individual condensers for storing the total energies of the respective photocurrents of such cells during the exposure, individual circuits comprising resistors for discharging the condensers after the exposure, and means operative after the exposure for producing a single reading indicative of the relative times of discharge to a predetermined low potential greater than zero of the condensers through their respective discharging circuits.

2. In a direct-reading spectrometer comprising means for focusing characteristic spectral lines of unknown and reference elements on separate photocells during an exposure period, the combination of individual condensers for storing the respective photocurrents of such cells, individual circuits comprising resistors for discharging the condensers, the mathematical products of the capacitance and resistance of each condenser-resistor pair being substantially equal for all pairs, switching means for connecting each condenser to its respective photocell during the exposure period and for connecting it to its discharging circuit after the exposure, and means for measuring and indicating the difference in the times of discharge to a predetermined low potential greater than zero of the unknown and the reference element condensers through their respective discharging circuits.

3. In a direct-reading spectrometer comprising means for focusing characteristic spectral lines of unknown and reference elements on separate photocells during an exposure period, the combination of individual condensers for storing the respective photocurrents of such cells, individual circuits comprising resistors for discharging the condensers, the mathematical products of the capacitance and resistance of each condenser-resistor pair being substantially equal for all pairs, individual electron-tube direct-current amplifiers for following the discharges of the condensers, switching means for connecting each condenser to its respective photocell during the exposure period and for connecting it after the exposure to its discharging circuit and to the input circuit of the corresponding amplifier, means responsive to the outputs of the respective amplifiers for initiating a separate recording impulse when the falling potential on each unknown element condenser reaches a predetermined low potential identical for all condensers and for terminating all such recording impulses when the potential in the reference element condenser reaches the predetermined low potential, and recording means for indicating separately the duration of each such impulse.

4. Apparatus according to claim 3 wherein the amplifier is a multi-stage amplifier comprising a feed-back circuit for rendering it highly stable during prolonged operation and wherein means are provided for breaking the feedback circuit during the condenser discharging period.

5. A direct-reading spectrometer for analysis by the internal standard method comprising, in combination with a spark source and a spectrometer: photocells for observing the intensities of the spectral lines of unknown and reference elements; individual condensers for storing the outputs of the photocells during an exposure period; a master shutter for initiating and terminating the exposure of the photocells to the spectral lines; optical means for focusing on each cell separate beams, one consisting of the corresponding spectral line together with its spectral background and the other consisting of background only; a compensating shutter provided with means for repeatedly alternating its position at brief equal intervals to cut off first one of the beams to each cell and then the other; reversing switches for repeatedly reversing the polarity of each condenser relative to its photocell in synchronism with the alternations of the shutter, the polarities being such that the condenser is charged by the photocell when the shutter is in position to admit the beam containing the spectral line; individual circuits comprising resistors for discharging the condensers after the exposure, the mathematical products of the capacitance and resistance of each condenser-resistor pair being substantially equal for all pairs; individual electron-tube direct-current amplifiers for following the discharges of the condensers; condenser switches for connecting each condenser to its respective photocell during exposure and for connecting it after the exposure to its discharging circuit and to the input circuit of the corresponding amplifier; relays responsive to the outputs of the amplifiers for initiating a separate recording impulse when the falling potential on each unknown element condenser reaches a predetermined low potential identical for all condensers and for terminating all such recording impulses when the potential on the reference element condenser reaches that potential; recording means for indicating separately the duration of each such impulse; and an automatic timing circuit for first energizing the source, then simultaneously opening the master shutter and activating the condenser switches to connect the condensers to their photocells, then activating the compensating shutter alternating means and finally, after a predetermined exposure period, activating the condenser switches to connect the condensers to their discharge circuits, amplifiers, and recording circuits.

6. Apparatus according to claim 5 wherein the amplifier is a multi-stage amplifier comprising a feed-back circuit for rendering it highly stable during prolonged operation, such circuit comprising a relay switch for breaking the circuit; and wherein the automatic timing circuit is connected to open such relay switch simultaneously with the final activation of the condenser switches.

7. In a direct-reading spectrometer having means for focusing characteristic spectral lines of an unknown and a reference element on separate photocells during an exposure period, the combination therewith of individual condensers for storing the total energies of the respective currents of such cells during the exposure, and electrical measuring means operative only after the exposure so constructed and connected as to produce a single reading indicative of the ratio of the charges stored in the said condensers.

8. A direct-reading spectrometer for analysis by the internal standard method, comprising, in combination with a spectrometer having an inlet slit and exit slits placed along the focal curve at positions corresponding to spectral lines of an unknown and a reference element: photocells mounted behind the focal curve in positions to receive the spectral lines passing through the exit slits, means for initiating and terminating exposure of the photocells to the spectral lines, individual condensers for storing the total energies of the respective photocurrents of the cells during the exposure, and electrical measuring means operative only after the exposure so constructed and connected as to produce a single reading indicative of the ratio of the charges stored in the said condensers.

9. In apparatus for integrating during an exposure period, and comparing the integrated values of, the intensities of the light from two varying sources, the combination of two photocells each receiving light from a different one of the sources, individual condensers for storing the total energies of the varying photocurrents of the cells during the exposure, and electrical measuring means operative only after the exposure so constructed and connected as to produce a single reading indicative of the ratio of the charges stored in the said condensers.

JASON L. SAUNDERSON.
VICTOR J. CALDECOURT.
EUGENE W. PETERSON.

REFERENCES CITED

The following references are of record in the file of this patent:

UNITED STATES PATENTS

| Number | Name | Date |
| --- | --- | --- |
| 1,812,763 | Stery | June 30, 1931 |
| 1,914,082 | Dennis | June 13, 1933 |
| 2,113,928 | Behr | Apr. 12, 1938 |
| 2,120,787 | Lowkrantz | June 14, 1938 |
| 2,157,389 | Park | May 9, 1939 |
| 2,253,976 | Guanella | Aug. 26, 1941 |
| 2,279,646 | Smith | Apr. 14, 1942 |
| 2,313,666 | Peterson | Mar. 9, 1943 |
| 2,340,880 | Keinath | Feb. 8, 1944 |
| 2,436,512 | Hollywood | Feb. 24, 1948 |
| 2,446,874 | Geffner et al. | Aug. 10, 1948 |

FOREIGN PATENTS

| Number | Country | Date |
| --- | --- | --- |
| 664,233 | Germany | Aug. 24, 1938 |

OTHER REFERENCES

The Photographic Journal for August 1934, pp. 423 and 424.